May 28, 1929.  G. MEYER  1,714,720
COMBINED TIRE RIM AND CHAINS THEREFOR
Filed June 7, 1928
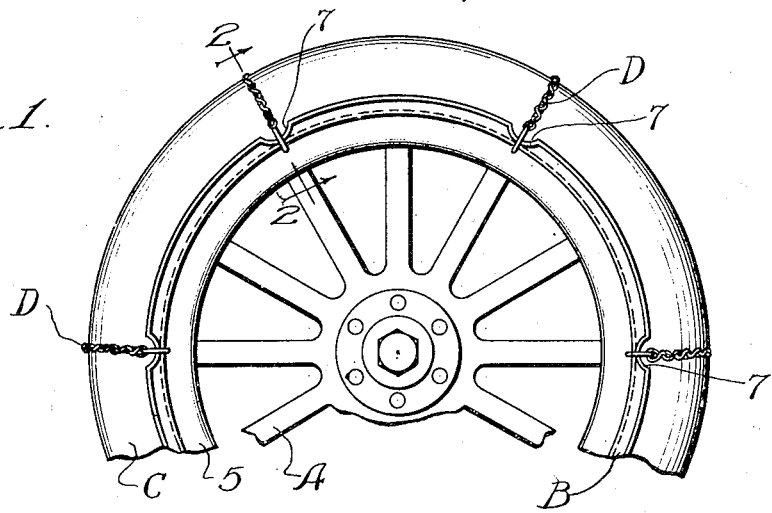
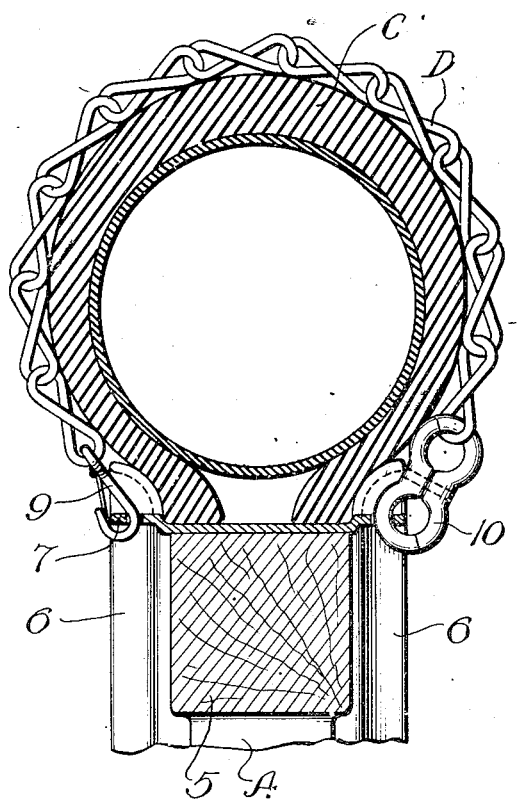
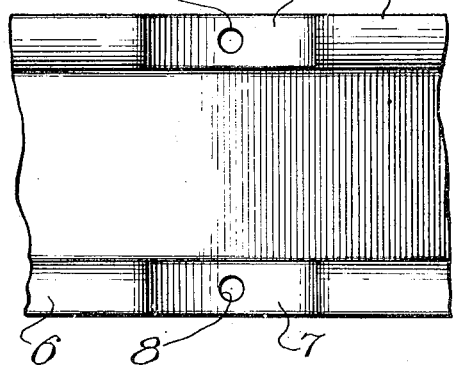
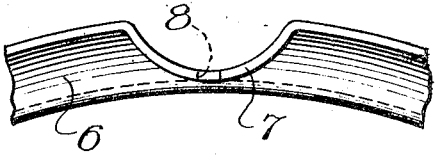
Inventor:
George Meyer Patented May 28, 1929.

1,714,720

UNITED STATES PATENT OFFICE.

GEORGE MEYER, OF QUINCY, ILLINOIS.

COMBINED TIRE RIM AND CHAINS THEREFOR.

Application filed June 7, 1928. Serial No. 283,501.

This invention which relates generally to a rim for vehicle tires is concerned particularly with certain features of construction by which the rim is adapted to cooperate directly with a plurality of short chains arranged transversely over the tire tread for the purpose of resisting skidding on slippery road surfaces. By the improvements of this invention, I have simplified the operation of attaching or detaching the chains relative to the tire, have reduced the expense of the chains which are so used, and have provided a positive and unfailing connection for the chains when positioned operatively upon the tire.

In the accompanying drawing is set forth a suggestive embodiment of my invention in the manner following:

Figure 1 is a fragmentary side elevation of a vehicle wheel equipped with the present rim to which I have shown a plurality of tire chains connected operatively;

Fig. 2 is an enlarged transverse section taken on line 2—2 of Fig. 1;

Fig. 3 is a fragmentary detail in plan looking upon a portion of the tire rim that is configured for the attachment thereto of one of the tread chains; and Fig. 4 is a fragmentary side elevation of the rim portion shown in Fig. 3.

My invention is applicable to a vehicle wheel A having applied to its felly 5, a rim B, demountable or otherwise, on which is carried a tire C. The rim is provided with opposite flanges 6 between which may be confined the tire base, as shown best in Fig. 2. At certain places 7 these flanges are outbent through an arc having its center beyond the wheel periphery so as to provide at points upon opposite sides of the rim a series of ears through each of which is a hole or slot 8. These ears, it will be noted, are so shaped and disposed that the holes 8 therein lie in a plane which is substantially even with the tire base.

The tire C is afforded an adequate lateral support by the rim flanges which engage with the tire base at all points except where the several ears 7 are formed. These ears, it will be noted, stand out laterally so as to be spaced from the adjacent flange of the rim and also from the overhanging sides of the tire. Because of these features of construction I am enabled to attach to each pair of ears the opposite ends of a chain D which may be extended transversely across the tire tread, as shown. One end of each chain may be equipped with a snap hook 9 to enter the hole 8 in one ear; at the opposite chain end is another hook 10 of any appropriate kind—a pivoted 8-link, for example—adapted to pass through the hole 8 in the proximate ear. By this means the two chain ends are detachably connected in a manner which is simple, sure, and speedy.

The construction herein described is advantageous in several particulars. The provision of the outturned ears on the rim flanges need involve no additional expense, and their presence would scarcely even be noted. At the same time these ears stand out just far enough to present the holes 8 conveniently for connecting the chains whenever it is desired to apply the latter to the tire, and sufficient clearance around these ears is afforded to facilitate such connection.

I claim:

1. A tire rim for vehicle wheels having outwardly flaring side flanges. one of said flanges having circumferentially spaced depressions in the periphery thereof providing cross-chain end receiving and attaching portions, the wall of each depression extending at substantially right angles to said flange and merging with the periphery thereof at its ends.

2. A tire rim for vehicle wheels having outwardly flaring side flanges, said flanges having oppositely disposed circumferentially spaced apertured depressed portions in the periphery thereof providing cross-chain end receiving and attaching portions.

3. A tire rim for vehicle wheels having outwardly flaring side flanges, said flanges having oppositely disposed circumferentially spaced apertured depressions in the periphery thereof providing cross-chain end receiving and attaching portions, the walls of said depressions scribing an arc from the periphery of said flange to a point adjacent the inner circumference of the rim.

4. A tire rim flange having circumferentially spaced depressed portions in the periphery thereof, said portions having cross-chain end receiving and attaching walls.

5. A tire rim flange having circumferentially spaced apertured depressed portions in the periphery thereof, providing cross-chain end receiving and attaching portions.

In testimony whereof, I have hereunto set my hand this 2nd day of June, 1928.

GEORGE MEYER.